United States Patent [19]

Toba et al.

[11] Patent Number: 4,656,537
[45] Date of Patent: Apr. 7, 1987

[54] HIGH SPEED REPRODUCTION METHOD AND APPARATUS

[75] Inventors: Akira Toba; Tsutomu Mizusawa, both of Fukaya, Japan

[73] Assignee: Kabushiki Kaisha Toshiba, Kawasaki, Japan

[21] Appl. No.: 813,656

[22] Filed: Dec. 26, 1985

[30] Foreign Application Priority Data

Dec. 27, 1984 [JP] Japan ................. 59-273662

[51] Int. Cl.$^4$ .................. G11B 5/008; G11B 15/44
[52] U.S. Cl. .................... 360/73; 360/10.3; 360/70
[58] Field of Search .............. 360/10.3, 70, 73

[56] References Cited

FOREIGN PATENT DOCUMENTS 55-38719  3/1980  Japan .

*Primary Examiner*—George G. Stellar
*Attorney, Agent, or Firm*—Cushman, Darby & Cushman

[57] ABSTRACT

Signals are recorded on a magnetic tape in the standard or long time recording mode. A capstan drive system has a plurality of control elements and controls the reproduction drive state of the tape in accordance with a rotation detection signal of a capstan motor and a signal reproduced from a control track of the tape. A disk control system has a plurality of control elements and controls the reproduction state of the tape by a rotary head in accordance with rotation detection signals from a disk motor and a disk. A high speed reproduction mode specifying unit specifies the first or second high speed reproduction mode for reproduction at a speed Ns (Ns is a positive integer of 2 or more) or Ns.N (N is a ratio of the tape speeds in the standard and long time recording modes) times the tape speed in the recording mode. A recording mode detection unit detects if the tape is recorded in the standard or long time recording mode. In response to the detection results of the recording mode detection unit and the specifying of the high speed reproduction mode specifying unit, a high speed reproduction control unit supplies a predetermined control signal to the capstan and disk control systems. The predetermined control signal includes a control signal for commonly controlling a predetermined control element among the plurality of control elements in accordance with the first or second high speed reproduction mode.

11 Claims, 4 Drawing Figures

HIGH SPEED REPRODUCTION METHOD AND APPARATUS

BACKGROUND OF THE INVENTION

This invention relates to a high speed reproduction controlling method and apparatus which are particularly suitable for high speed reproduction control of a tape recorder which records or reproduces information by helically tracks on a tape using two rotary heads.

A home video tape recorder (to be referred to as a VTR hereinafter) adopting the recording/reproduction system described above has a high speed reproduction unit. In order to search a desired portion of a magnetic tape, the unit drives the tape at a speed several times to 20 times that used during recording.

There is a strong demand from users that a plurality of speeds be available or that search speed be variable, in order to allow easy search.

In order to provide this capability, however, a servo circuit for controlling the capstan for driving the tape must be arranged for each speed to be set. In addition, a correction circuit must be included for each different speed to correct deviations in horizontal frequency. Such deviations are caused by a large difference in relative speed beween the tape and the head in the recording and reproduction modes. Incorporation of the servo and correction circuits results in complexity for the entire VTR unit. In the high speed reproduction mode, since the head traces across tracks, noise bars are generated on the TV screen for displaying reproduced signals. There has been a strong demand for fixing the positions of these noise bars on the screen. In addition, then, a circuit for fixing the positions of the noise bars is required for each speed.

In the high speed reproduction unit of a VTR of the above type, the circuit configuration is complex and the number of adjustment locations is increased. As a result, the number of manufacturing steps is increased, and reliability suffers.

SUMMARY OF THE INVENTION

It is, therefore, an object of the present invention to provide a new and improved high speed reproduction controlling method and apparatus which have a common control element required for two high speed reproduction modes and which can simplify the overall circuit configuration.

The present invention has been established based on the finding that the magnetic tape drive speed in a home VTR, for example, can be changed in the standard time recording mode (to be referred to as the Sp mode hereinafter) and the long time recording mode (to be referred to as the Ep mode hereinafter). The above object of the present invention is achieved by setting the tape speed for high speed reproduction at speeds Ns times and (Ns·N) times that used in the recording mode. Note that N is the ratio of the tape speeds in the two recording modes Sp and Ep and is, e.g., 3, and Ns is a positive integer of 2 or more and is, e.g., 5.

According to one aspect of the present invention, there is provided a method of controlling high speed reproduction using a tape wherein information signals are recorded to sequentially form helical information tracks at first running speed Vt and at second running speed Vt·N, and wherein control signals of a predetermined frequency are recorded to form a continuous control track along the longitudinal direction of the tape, the method comprising the steps of:

selectively specifying a first or second high speed reproduction mode at a speed Ns times or Ns·N times (where Ns is a positive integer of 2 or more) the tape speed in the recording mode;

detecting if the speed of the tape in the recording mode is first speed Vt or second speed Vt·N; and controlling a common control element required for a first high speed reproduction mode for reproduction at a speed Ns·N times first speed Vt and for a second high speed reproduction mode for reproduction at a speed Ns times second speed Vt·N when high speed reproduction of the tape is controlled in accordance with the specified first or second high speed reproduction mode and the detected first or second speed.

BRIEF DESCRIPTION THE DRAWINGS

These and other objects and features of the present invention can be understood by reference to the accompanying drawings, in which.

DETAILED DESCRIPTION OF THE PREFERRED EMBODIMENT

The present invention will be described in detail with reference to the accompanying drawings.

Figure 1:
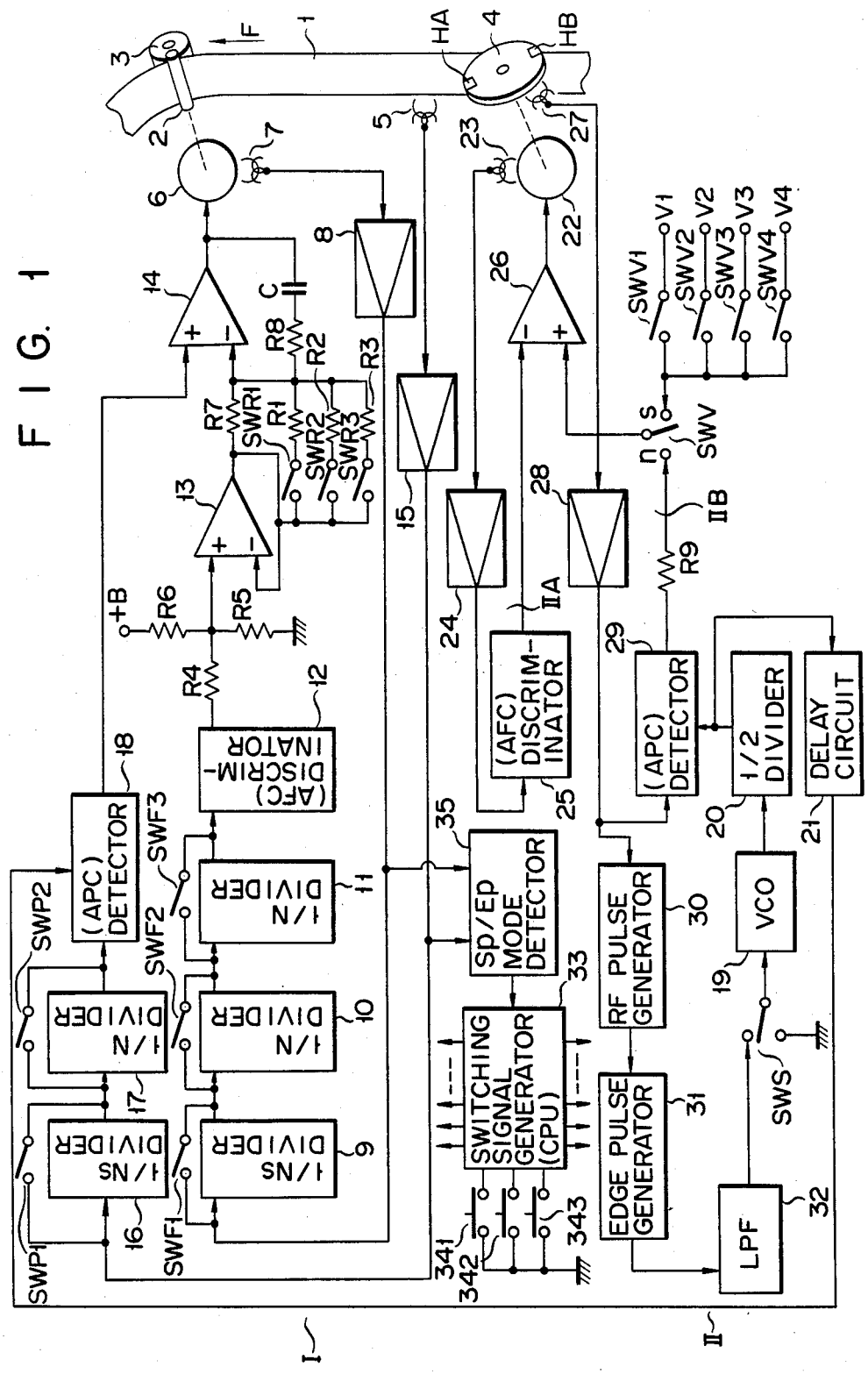
FIG. 1 is a circuit diagram showing an embodiment of the present invention.

FIG. 1 is a circuit diagram showing the circuit configuration when the present invention is applied to a home VTR.

The recording mode will first be described. Magnetic tape 1 is driven by capstan 2 and pinch roller 3 in direction F at a predetermined speed in the Sp or Ep mode. Magnetic heads HA and HB are arranged on rotary disk 4. Heads HA and HB record video signals from a recording system (not shown) on tape 1 so as to sequentially form helical tracks. Control signals representing the position of the video tracks are continuously recorded along the longitudinal direction of tape 1 by control head 5. The control signals are normally rectangular waves obtained by frequency dividing at a ratio of ½ the vertical sync signal of the recording video signal, and become a reference signal in record operation. Rotary disk 4 is phase-controlled with reference to the vertical sync signal. As a result, the control signal represents the position of the video track.

The apparatus of the present invention is directed to high speed reproduction control for searching a desired portion of magnetic tape 1 on which signals are recorded in the Sp or Ep mode.

The following description will thus be made with reference only to such a control system.

The control system required for reproduction includes capstan control system I and rotary disk control system II.

Capstan control system I has automatic frequency control (to be referred to as AFC hereinafter) system IA. System IA keeps constant the frequency of a capstan FG pulse obtained from head 7 for detecting the rotation of capstan motor 6 for driving capstan 2. System I also includes an automatic phase control (to be referred to as APC hereinafter) system IB. System IB controls so that the control signal reproduced by control head 5 has a predetermined phase relationship with a first reference signal to be described later.

In AFC system IA, the capstan FG pulse is shaped and amplified by amplifier 8. The pulse is then supplied to pulse frequency discriminator 12 for AFC through a parallel circuit consisting of 1/Ns frequency divider 9 and first switch SWF1, a parallel circuit consisting of first 1/N frequency divider 10 and second switch SWF2, and a parallel circuit consisting of second 1/N frequency divider 11 and third switch SWF3. Discriminator 12 discriminates frequency of the FG pulse and produces a signal having level in response to the discriminated frequency. This output from detector 12 is supplied to the non-inverting input terminal (+) of first operational amplifier 13 through resistor R4. The non-inverting input terminal (+) is connected to ground through resistor R5 and to power source (+B) through resistor R6. The output from amplifier 13 is fed back to the inverting input terminal (−) thereof and is supplied as an AFC signal to the inverting input terminal (−) of second operational amplifier 14 through resistor R7. The output from amplifier 14 controls capstan motor 6. Note that resistors R1 to R3 for correcting the loop gain of AFC system IA are connected in parallel with resistor R7 through switches SWR1 to SWR3. Resistor R8 and capacitor C are series-connected between the inverting input terminal (−) and the output terminal of second operational amplifier 14.

APC system IB has the following configuration. After the control signal reproduced by control head 5 is shaped and amplified by amplifier 15, it is supplied to APC detector 18 through a parallel circuit consisting of APC 1/Ns frequency divider 16 and first switch SWP1 and a parallel circuit consisting of 1/N frequency divider 17 and second switch SWP2. APC detector 18 receives a first reference signal. The first reference signal is obtained by frequency dividing at a ratio of ½ the output from voltage controlled oscillator (to be referred to as VCO hereinafter) 19, having an oscillation frequency equal to the field frequency (60 Hz in NTSC case), and delaying the frequency-divided signal for tracking by delay circuit 21. Detector 18 detects the phase difference between the first reference signal and a signal supplied through divider 16 or switch SWP1, and divider 17 or switch SWP2. The phase difference detection signal from the detector 18 is supplied as an APC signal to the non-inverting input terminal (+) of second operational amplifier 14. The output from operational amplifier 14 is supplied to capstan motor 6.

AFC and APC systems IA and IB of capstan control system I have the above arrangements. Since both AFC and APC signals are mixed by operational amplifier 14, amplifier 14 is commonly used by the two systems.

Rotary disk control system II has AFC system IIA. System IIA maintains a constant frequency in the a disk FG pulse obtained from head 23, which detects rotation of disk motor 22 for driving rotary disk 4. Control system II also has APC system IIB for maintaining the PG pulse generated by PG head 27 such that it has a predetermined phase relationship with the first reference signal.

In AFC system IIA, the disk FG pulse is shaped and amplified by amplifier 24. Pulse frequency discriminator 25 discriminates frequency and produces a signal having level in response to the discriminated frequency. The produced signal is supplied to the inverting input terminal (−) of operational amplifier 26. The output from operational amplifier 14 controls disk motor 22.

In APC system IIB, head 27 produces a PG pulse which represents the rotational phase of disk 4. The PG pulse is shaped and amplified by amplifier 28 and is supplied to APC detector 29. Detector 29 compares the phases of the PG pulse and a second reference signal from ½ frequency divider 20. The signal from detector 29 representing the phase difference is supplied to the non-inverting input terminal (+) of operational amplifier 26 through resistor R9 and terminal n of switch SWV. The output from operational amplifier 26 controls disk motor 22.

Switch SWV has switching terminals n and s. Terminal n is connected to resistor R9, and terminal s is connected to potential points V1 to V4 through parallel switches SWV1 to SWV4. The output from operational amplifier 26 is supplied to head switching pulse (to be referred to as RF pulse hereinafter) generator 30 and is converted into an RF pulse. The RF pulse is then converted by edge pulse generator 31 into a pulse generated at the two edges of the RF pulse, which in turn is converted into a DC voltage by low-pass filter 32. The DC voltage is applied to VCO 19 through terminal n of switch SWS in the high speed reproduction mode to be described later.

Referring to FIG. 1, reference numeral 33 denotes a switching signal generator for supplying predetermined switching signals to switches SWF1 to SWF3, SWP1, SWP2, SWV1 to SWV4, SWV and SWS. Generator 33 generates predetermined switching signals based on input signals from control key 341 for normal reproduction, fast forward or rewinding control key 342 or 343 selectively operated together with control 341, and Sp/Ep mode detector 35 to be described later. Generator 33 comprises, e.g., a microprocessor. When control key 342 or 343 is selectively operated together with control key 341, generator 33 determines whether control key 342 or 343 has been operated instantaneously or continuously by detecting whether the input by its operation is a pulse or a DC voltage. If the operation is instantaneous, generator 33 generates a switching signal required for the cue or review state in the Ns high speed reproduction mode to be described later. If the operation is continuous, on the other hand, generator 33 generates a switching signal required for the cue of review state in the Ns·N high speed reproduction mode to be described later. Furthermore, the selection of the tape running speed in the cue or review state may be performed by cue or review control key which is provided a exclusively other than the fast forward or rewinding control key.

Sp/Ep mode detector 35 detects if tape 1 has been recorded in the Sp or Ep mode in accordance with the frequency ratio of the outputs of amplifiers 8 and 15 of capstan control system I in this embodiment.

Tables 1 to 3 below show the control modes of the respective switching signals from generator 33. The control modes of switches SWV and SWS will be described later.

TABLE 1

| | Reproduction Mode | | |
|---|---|---|---|
| Switch No. | Normal Reproduction | Ns Reproduction | Ns · N Reproduction |
| SWF1, SWP1 | ON | OFF | OFF |
| SWF2, SWP2 | ON | ON | OFF |

TABLE 1-continued

| Switch No. | Reproduction Mode | | | |
|---|---|---|---|---|
| | Normal Reproduction | | Ns Reproduction | Ns · N Reproduction |
| SWF3 | Sp | OFF | OFF | OFF |
| | Ep | ON | ON | ON |

TABLE 2

| Switch No. | Reproduction Mode | | | |
|---|---|---|---|---|
| | Normal Reproduction | | Ns Reproduction | Ns · N Reproduction |
| SWR1 | Sp | ON | OFF | — |
| | Ep | OFF | OFF | OFF |
| SWR2 | Sp | OFF | OFF | — |
| | Ep | OFF | ON | OFF |
| SWR3 | Sp | OFF | ON | — |
| | Ep | OFF | OFF | ON |

TABLE 3

| Recording Mode | Reproduction Mode | | |
|---|---|---|---|
| | Cue/Review | Ns Reproduction | Ns · N Reproduction |
| EP | Cue | Only SWV1 ON | Only SWV3 ON |
| | Review | Only SWV2 ON | Only SWV4 ON |
| Sp | Cue | Only SWV3 ON | — |
| | Review | Only SWV4 ON | — |

The operation modes of the embodiment of the present invention having the above arrangement will be described below.

In the normal reproduction mode set upon operation of control key 341, switches SWF1, SWF2, SWP1, and SWP2 are all ON as shown in Table 1, and frequency dividers 9, 10, 16 and 17 are passed. Switch SWF3 is controlled in accordance with the drive speed of the magnetic tape in the recording mode; it is ON in the Ep mode and OFF in the Sp mode. As for switches SWR1 to SWR3, only switch SWR1 is controlled; it is ON in the Sp mode and OFF in the Ep mode, as shown in Table 2. Switches SWR2 and SWR3 remain OFF. In this case, switch SWV is switched to terminal n. An APC signal is then supplied to operational amplifier 26. When switch SWS is switched to terminal n, VCO 19 freely oscillates at the field frequency.

In the normal reproduction mode, then, the tape speed is set to a speed 1/N of the speed during recording in the Sp or Ep mode. The travel of tape 1 and the rotation of disk 4 are phase-locked so that heads HA and HB correctly trace recording tracks on tape 1 at the selected speed.

When it is determined that control key 342 or 343 has been operated instantaneously with control 341 and the Ns high speed reproduction mode is set, switches SWF1 to SWF3, SWP1 to SWP3, and SWR1 to SWR3 are controlled as shown in Tables 1 and 2. Switches SWF2 and SWP2 are turned on, and frequency dividers 10 and 17 are passed. Switches SWF3, SWR2, and SWR3 are controlled in accordance with the Sp or Ep recording mode. Tape 1 is then driven at a speed Ns times that during recording in the forward or reverse direction. Since switch SWV is switched to terminal s, supply of the APC signal to disk motor 22 is cut off. As shown in Table 3, switches SWV1 to SWV4 are controlled, and one of fixed voltages V1 to V4 is supplied to the non-inverting input terminal (+) of operational amplifier 26 in place of the APC signal. The rotation of disk 4 is controlled such that the horizontal frequency of the reproduced video signal remains at an almost normal value (nearly 15.75 KHz in NTSC case). Since switch SWS is switched to terminal s, the edge pulses obtained from the disk PG pulse are supplied to VCO 19 as DC trigger control signals through a low pass filter 32. Because the oscillation frequency of VCO 19 is controlled in response to the rotation of disk 4, the reference signal of APC system IB of system I is switched to a signal corresponding to the rotation of disk 4. The travel of tape 1 and the rotation of disk 4 are then phase-locked, and the generation positions of noise bars on the screen are fixed. In this state, the travel speed of tape 1 is not precisely Ns times that in the recording mode. However, the ratio of the frequency of the reproduced control signal to the rotational frequency of disk 4 is Ns times that used in the recording mode (normal reproduction mode). This is defined as Ns high speed reproduction, and corresponds to normal cue or review operation.

In the Ns·N high speed reproduction mode, the respective switches are controlled as shown in Tables 1 to 3. Due to the presence of frequency dividers 9, 10, 16, and 17, tape 1 is driven at a speed Ns N times that in the recording mode. Since switch SWV is switched to terminal s, supply of the APC signal to disk 4 is blocked, just as in the Ns high speed reproduction mode. Voltage V3 (cue mode) or voltage V4 (review mode) is applied to the non-inverting input terminal (+) of operational amplifier 26. Disk 4 is corrected so that the horizontal frequency of the reproduced video signal is normal. Since switch SWS is switched to terminal s, VCO 19 is controlled in accordance with the rotational frequency of disk 4, and the reference signal of APC system IB for capstan motor 6 is switched to a signal of a frequency corresponding to the rotation of disk 4. In this way, the travel of tape 1 and the rotational phase of disk 4 are phase-locked, and the positions of noise bars on the screen are fixed. This state is defined as the Ns·N high speed reproduction mode.

When tape 1 is recorded in the Sp mode, the Ns·N high speed reproduction mode cannot be selected (refer to dashes in Tables 2 and 3). If the Ns·N high speed reproduction mode is selected, the tape may be driven at speeds up to 75 times the normal speed depending upon the specific value of Ns (e.g., 5), and damage may result.

The servo loop gain of control system I will be described below.

Figure 2:
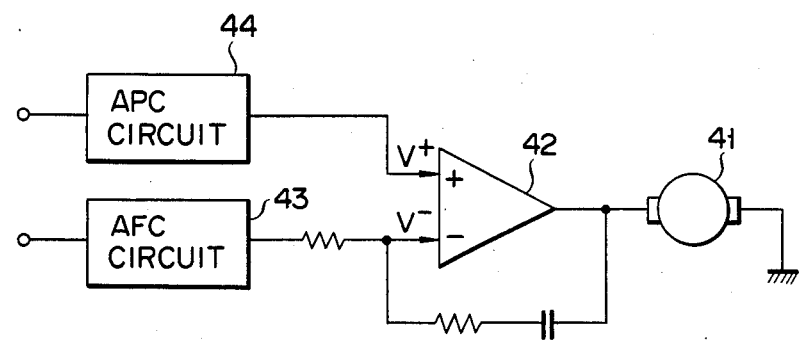
FIG. 2 is a diagram of a general mixing circuit for mixing AFC and APC signals.

FIG. 2 shows a mixing circuit for the AFC and APC signals.

In this circuit, motor 41 is controlled such that the voltage (V+) at the non-inverting input terminal and the voltage (V−) at the inverting input terminal of operational amplifier 42 are equal. Therefore, when the input signal frequency of AFC circuit 43 changes, the locking phase of APC circuit 44 also changes. In the case of high speed reproduction for fixing the positions of noise bars on the screen, the frequency of the reproduced control signal is an integer multiple of the RF pulse. However, since the RF pulse frequency is different from that in the normal reproduction mode due to horizontal frequency correction, the AFC input signal frequency obtained by frequency division of the capstan FG pulse by a number corresponding to Ns·N is also different from that in the normal reproduction mode. Therefore, a phase locking error occurs in the APC loop.

Figure 3:
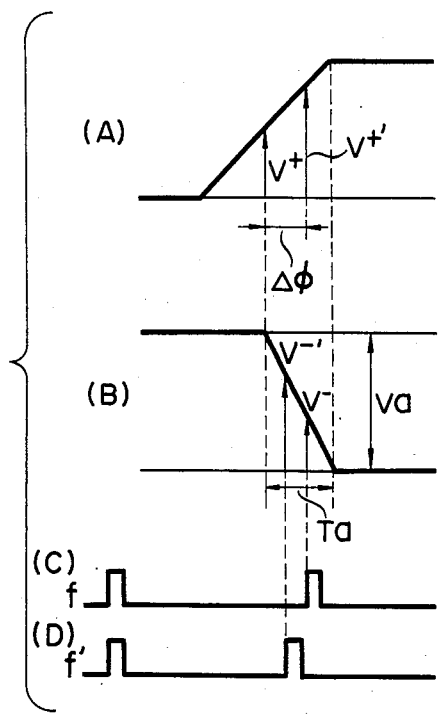
FIGS. 3A to 3D are timing charts for explaining the mode of operation of the circuit shown in FIG. 2.

A description will now be made with reference to FIGS. 3A to 3D. FIG. 3A shows a trapezoidal wave showing the detection characteristics of APC circuit 44. The trapezoidal wave in FIG. 3B shows the detection characteristics of AFC circuit 43. Note that refernece symbol Ta represents an AFC linear control range and Va, an AFC dynamic range. FIGS. 3C and 3D show input signals to AFC circuit 43. Assume that the frequency of the input signal to AFC circuit 43 changes from f to f' as shown in FIGS. 3C and 3D. In this case, the level of the AFC signal increases from level V− to V−', as shown in FIG. 3B. Then, as shown in FIG. 3A, the APC signal level also increases from V+ to V+', thereby causing a phase locking error of $\Delta\phi$. This phase locking error results in a phase error between the RF pulse and the reproduced control signal. In addition, since the two input signals V+ and V− of operational amplifier 42 are different in both normal and high speed reproduction modes, in the control stable state, the transient response to the changing of mode is delayed by the time constants of the various filter systems.

In order to solve this problem, a plurality of AFC circuits having different characteristics are arranged. The AFC circuits are switched, so that the locking phase is not changed even if the input signal frequency changes. With this technique, however, the number of parts is increased significantly.

According to the present invention, as shown in FIG. 1, a gain attenuation circuit consisting of resistors R4 to R6 is inserted at the output terminal of AFC detector 12. Then, after the DC gain of the AFC signal is attenuated to 1/m (where m is 2 or 3), the signal is supplied to mixing operational amplifier 14 through operational amplifier 13.

Figure 4:
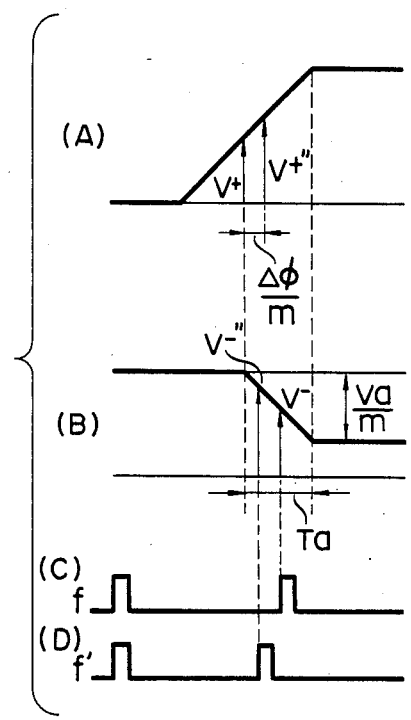
FIGS. 4A to 4D are timing charts for explaining the mode of operation of the capstan control system shown in FIG. 1.

Now, assume that the input signal (FIGS. 4C and 4D) of discriminator 12 changes from f to f' as shown in FIGS. 3C and 3D. In this case, the AFC signal level changes from V− to V−', and the change is 1/m that of the case in FIG. 3B. Therefore, the change in the APC signal level from V+ to V+" as shown in FIG. 4A is 1/m that of the case in FIG. 3B. As a result, the phase locking error is reduced to a negligible level $\Delta\phi/m$ (m: 2 or 3, for example). Thus, the above problem is solved.

Simplification of the circuit will be described below.

When the magnetic tape is driven in the forward direction (the same direction as in recording), the speed multiplication factor is Ns, and the magnetic tape speed in the recording mode is Vt, the horizontal frequency correction amount in high speed reproduction is normally proportional to (Ns−1)×Vt. When the magnetic tape is driven in the reverse direction, the correction amount is proportional to (Ns+1)×Vt. Since the correction amount can be approximated as Ns×Vt in both directions, when Ns is increased to a certain level, the correction amount becomes substantially the same in both the Ns·N and Ns high speed reproduction modes, respectively corresponding to tape speeds of Vt and Vt·N in the recording mode. Therefore, when the magnification factors for the two high speed reproduction modes are set as Ns and Ns·N, a common correction amount can be used for horizontal frequency correction. In the embodiment shown in FIG. 1, reference voltages V3 and V4 are used for the Ns·N and Ns high speed reproduction modes in the Ep and Sp modes, respectively.

The servo loop gain of capstan control system I is determined by the travel speed of the magnetic tape, the sampling frequency or slope of the trapezoidal wave of the AFC discriminator for detecting the tape speed, the gain of the electrical amplifier, the gain of the mechanical transmission system, and the like. However, when only the travel speed of the magnetic tape is changed, the loop gain is inversely proportional to the travel speed of the magnetic tape.

Therefore, the servo loop gain becomes substantially the same in the Ns·N and N high speed reproduction modes since the tape speed is substantially the same. When the magnification factors for the two high speed reproduction modes are set as Ns and Ns·N, a single loop gain correction circuit need be used. In the embodiment shown in FIG. 1, as shown in Table 2, resistor R3 for loop gain correction is commonly used in Ns·N and Ns high speed reproduction modes.

In order to fix the positions of the noise bars on the screen, the phases of the RF pulse and the reproduced control signals must be locked. However, since the frequency of the RF pulse is shifted from that in normal reproduction due to horizontal frequency correction, a special APC circuit must be included for high speed reproduction in the conventional circuit. However, according to the present invention, VCO 19 for generating a reference signal supplied to APC detector 18 is controlled by the RF pulse, thereby solving the problem with a simple circuit configuration.

According to the present invention, since the magnification factors are set as Ns·N and Ns, the AFC reference voltage for the horizontal frequency correction disk control system, and the loop gain correction constant for the capstan control system can be commonly used. The overall circuit is thus simplified. Since the VCO for generating an APC reference signal for capstan servo is controlled by the RF pulse, the screen noise bars can be fixed in position with a simple circuit configuration. By reducing the AFC DC gain for capstan servo, the locking phase error for capstan APC by horizontal frequency correction can be minimized.

The present invention is not limited to the particular embodiment described above, and various changes and modifications can be made within the spirit and scope of the present invention.

For example, the present invention can be similarly applied to an audio PCM tape recorder for recording and reproducing PCM (digital) audio signals on and from a magnetic tape.

What is claimed is:

1. A method of controlling high speed reproduction using a tape wherein information signals are recorded to sequentially form helical information tracks at first speed Vt and second speed Vt·N and control signals of a predetermined frequency are recorded to form a continuous control track along the longitudinal direction of the tape, said method comprising the steps of:
   selectively specifying a first or second high speed reproduction mode at a speed Ns times or Ns·N times (where Ns is a positive integer of 2 or more) the tape speed in the recording mode;
   detecting if the speed of the tape in the recording mode is first speed Vt or second speed Vt·N; and
   controlling a common control element required for a first high speed reproduction mode for reproduction at a speed Ns·N times first speed Vt and for a second high speed reproduction mode for reproduction at a speed Ns times second speed Vt·N when travel and high speed reproduction of the tape is controlled in accordance with the specified first or second high speed reproduction mode and the detected first or second speed.

2. A method according to claim 1, wherein first speed Vt is given in a long time recording mode.

3. A method according to claim 1, wherein second speed Vt·N is given in a standard time recording mode.

4. A method according to claim 1, wherein N is 3.

5. A method according to claim 1, wherein Ns is 5.

6. A method according to claim 1, wherein the predetermined control element is a loop gain correction element of a drive control system of the tape.

7. A method according to claim 1, wherein the predetermined control element is a reference voltage source for horizontal frequency correction of a reproduction control system of the tape.

8. An apparatus for controlling high speed reproduction using a tape wherein information signals are recorded to sequentially form helical information tracks at first speed Vt and second speed Vt·N and control signals of a predetermined frequency are recorded to form a continuous control track along the longitudinal direction of the tape, said apparatus comprising:

tape drive means which is provided rotatably, and for driving the tape at a predetermined speed;

first reproducing means for reproducing the control track of the tape;

second reproducing means which is provided rotatably, and for reproducing an information track of the tape;

first drive means for supplying a rotational drive force to said tape drive means;

second drive means for supplying a rotational force to said second reproducing means;

reproduction mode specifying means for selectively specifying the first or second high speed reproduction mode which is an Ns (where Ns is a positive integer of 2 or more) high speed reproduction mode wherein the tape speed is Ns times that during recording and an Ns·N high speed reproduction mode wherein the tape speed is Ns·N times that during recording;

recording mode detecting means for detecting if the recording mode of the tape is the first or second recording mode;

first rotation detecting means for detecting a rotation state of said first drive means;

second rotation detecting means for detecting a rotation frequency of said second drive means;

third rotation detecting means for detecting a rotation state of said second reproducing menas;

first control means, having a control section consisting of a plurality of control elements for generating a control signal which controls into a predetermined speed the tape speed from an output of said first rotation detecting means, and a control signal which controls into the same phase relation between the tape travel and the rotation of said second reproducing means from an output of said first reproducing means and an output of said third rotation detecting means, for supplying the control signals to said first drive means;

second control means, having a control section consisting of a plurality of control elements for generating a control signal which controls into a predetermined speed the rotation speed of said second reproducing means from an output of said second rotation detecting means, for supplying the control signal to said second drive means;

third control means, responsive to a command from said reproduction mode specifying means and an output from said recording mode detecting means, for supplying, to said control sections of said first and second control means, predetermined tape travel and reproduction control signals corresponding to the respective modes, which include a control signal for commonly controlling a predetermined control element among said plurality of control elements in the first or second high speed reproduction mode.

9. An apparatus according to claim 8, wherein said control section of said first control means comprises:

a first automatic frequency control system consisting of a first 1/Ns frequency divider and first and second 1/N frequency dividers, which are series-connected to an output terminal of said first rotation detecting means, first to third switches which are parallel-connected between input and output terminals of said frequency dividers, a first frequency discriminator connected to an output terminal of said second 1/N frequency divider, fourth to sixth switches having one end commonly connected to an output terminal of said first frequency detector, and first to third loop gain correction elements having one end connected to a corresponding other end of each of said fourth to sixth switches and the other end commonly connected, an automatic phase control system consisting of a speed 1/Ns frequency divider and a third 1/N frequency divider which are series-connected to an output terminal of said first reproducing means, seventh and eighth switches which are parallel-connected between input and output terminals of said frequency dividers, a voltage controlled oscillator which is controlled by an output of said third rotation detecting means, and a first phase difference detector connected to output terminals of said third 1/N frequency divider and said voltage controlled oscillator, and a first operational amplifier for mixing the outputs from said first automatic frequency control system and said automatic phase control system and for supplying the mixed signal to said first drive means;

said control section of said second control means comprises:

a second automatic frequency control system consisting of an amplifier, a second frequency discriminator, a second operational amplifier, ninth to 12th switches having one switching terminal commonly connected to the other input terminal of said second operational amplifier and first to fourth voltage sources each of which is connected to a corresponding other switching terminal of said ninth to 12th switches, and an output of said second operational amplifier is supplied as the control signal to said second drive means which are series-connected to an output terminal of said second rotation detecting means; and said first to 12th switches are controlled by predetermined control signals from said third control means.

10. An apparatus according to claim 9, wherein said first automatic frequency control system includes a gain control circuit connected between said first frequency discriminator and said fourth to sixth switches.

11. An apparatus according to claim 9, wherein said first automatic frequency control system includes a third operational amplifier and a resistor which are series-connected between said first frequency discriminator and the other end of each of said first to third gain correction elements.

* * * * *